Aug. 11, 1936.  C. A. KLISE  2,050,889
GLARE DIMMING ATTACHMENT FOR WINDSHIELDS
Filed April 18, 1934  2 Sheets-Sheet 1
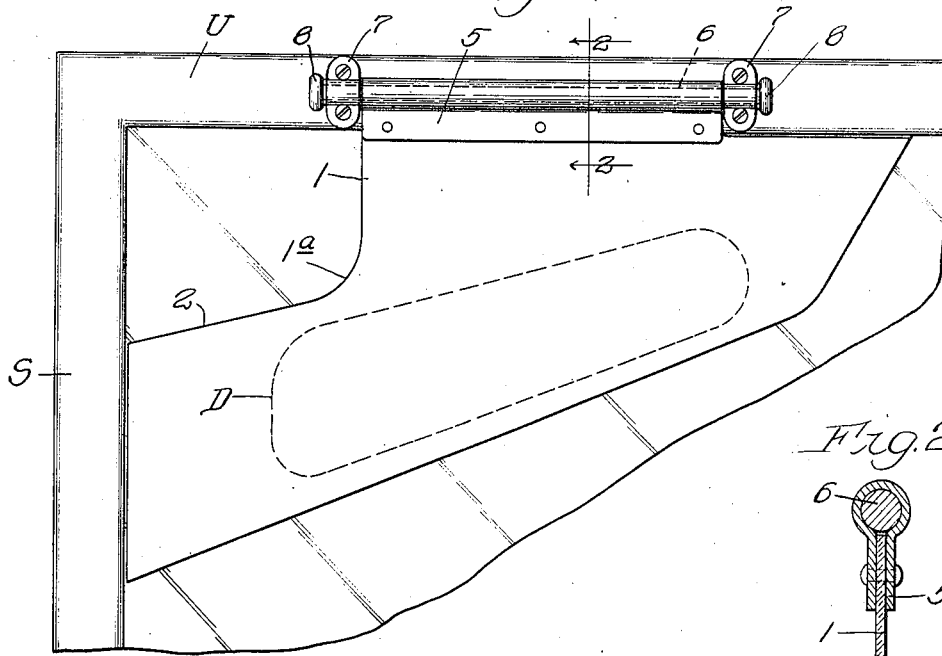
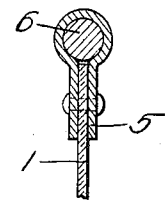
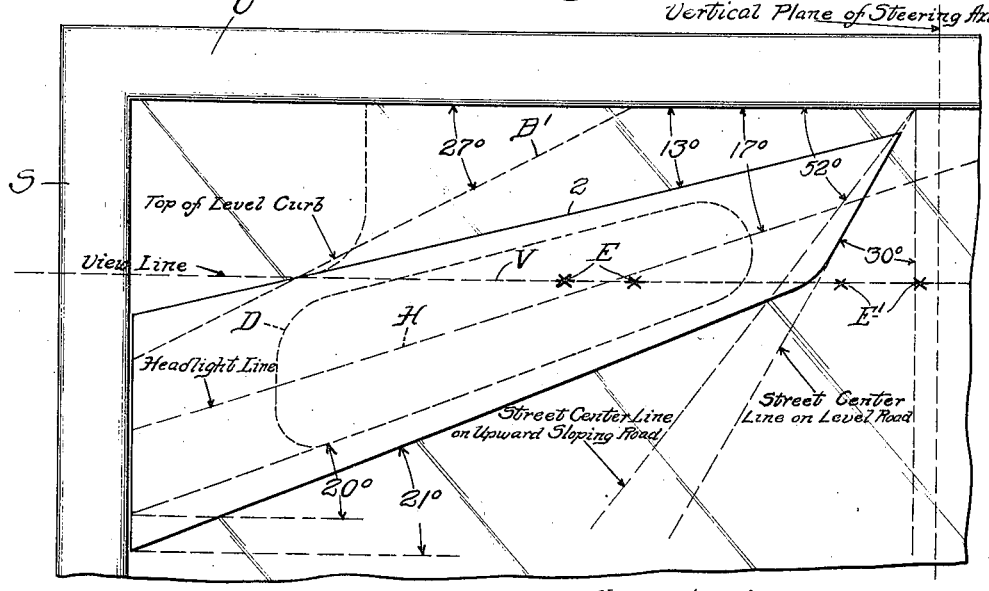
Inventor:
Chester A. Klise
by Albert Scheible
Attorney Aug. 11, 1936. C. A. KLISE 2,050,889
GLARE DIMMING ATTACHMENT FOR WINDSHIELDS
Filed April 18, 1934 2 Sheets-Sheet 2
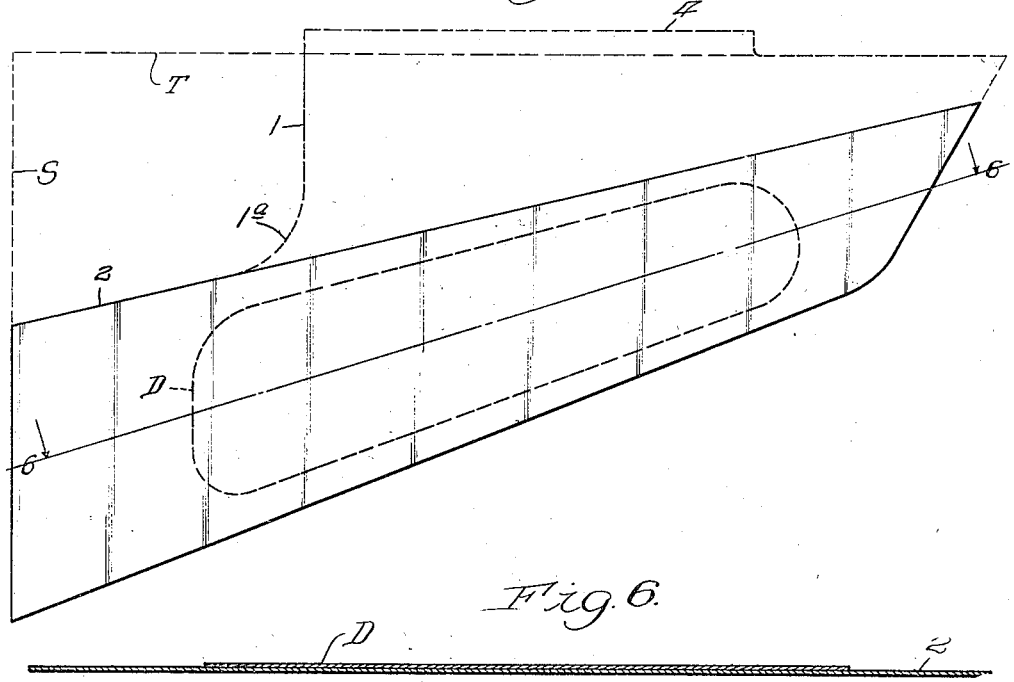
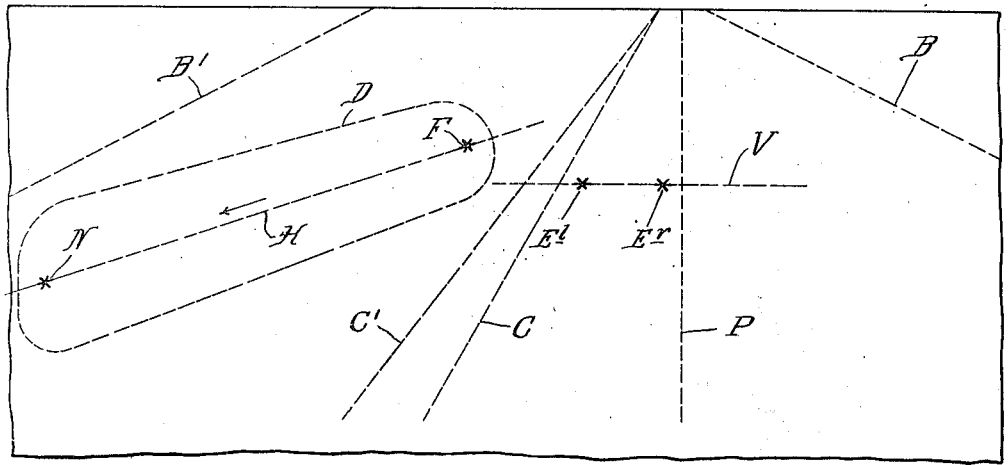
Inventor:
Chester A. Klise Patented Aug. 11, 1936

2,050,889

UNITED STATES PATENT OFFICE 2,050,889

GLARE-DIMMING ATTACHMENT FOR WINDSHIELDS

Chester A. Klise, Chicago, Ill.

Application April 18, 1934, Serial No. 721,100

7 Claims. (Cl. 296—97)

My invention relates to a glare-eliminating shield adapted to be supported adjacent to the windshield of an automobile, for preventing the driver of such a vehicle from having the glare of oncoming headlights interfere with the safety of his driving.

In general, my invention aims to provide a simple and inexpensive glare shield which will effectively eliminate the glare effect of headlights on cars approaching the driver in the portion of the road at his left, while still affording an adequate viewing of the roadway ahead of the driver, of the adjacent wheels of cars passing his own, of pedestrians crossing the road, and of stop-lights and street signs at the left side of the road.

Furthermore, my invention aims to accomplish the above recited purposes while permitting the driver to have a continuous and unobstructed view of the road directly ahead of him and of all objects to the right of the center line of the road, during his normal view of the road.

In addition, my invention aims to provide a glare-eliminator affording the above recited advantages and including a glare-shield portion which will be effective under many driving conditions for reducing the glare of sunlight, and aims to construct the glare shield so that it will enhance the safety of the driving by automatically tending to fix the eyes of the driver on the straight-ahead roadway.

In still another important object, my invention aims to construct a glare shield of the above recited class which will be effective for eliminating the glare of approaching headlights, and yet will not cause the driver's vision to be blurred by retinal shocks when his head is shifted out of its normal position.

In the development of glare-shields for automobiles it has long been known that an opaque shield of comparatively quite small size may cut off the glare of approaching headlights so long as the driver keeps his head in a substantially fixed position, provided also that these headlights on approaching cars are properly adjusted as to their focusing direction. However, if an oncoming car is approaching so close to the lane of the driver's car that the driver must tilt his head to see the nearer fender and front wheel of the approaching car, this shifting of his head causes his eyes to receive at least the off-spreading rays of the approaching headlight, and the transition from the relative darkening of his eyes by the opaque glare-shield to the entirely undimmed glare of a headlight practically blinds the driver during the time interval required by his eyes for readjusting themselves. Consequently, during every such time interval, the driver of the automobile cannot get an adequate view of any car at either side of his own, of a car that may be crossing or turning in from a cross-road, or of pedestrians on the road, so that accidents are apt to result from such a use of an opaque glare screen.

To reduce the risk of such accidents, such glare-shields heretofore have also been made of materials of less transparency than glass, as for example green or amber colored celluloid sheets of a uniform light-dimming density adequate for eliminating the glare of any oncoming headlights when this is even at the shortest distance at which the beam of the headlight will reach the driver's eyes. However, the light-dimming density required for this purpose is so great that it unduly obscures the driver's view of the nearer front fender of a car approaching his own car in the nearest lane, that he cannot adequately see pedestrians starting to cross the road from the left, and also cannot get a view of the driver of the approaching car.

On the other hand, if the density of the glare-shield is reduced so that the driver can adequately make the just recited observations, the shield no longer will adequately eliminate the glare of approaching headlights, particularly when the latter are between thirty and two hundred feet from him.

Moreover, if the glare-shield has its left-hand edge extending downwardly contiguous to the left-hand riser of the windshield frame and reaching upward to the top of the windshield, the driver cannot see stop-lights or street signs along the left-hand side of the road sufficiently clearly through the shield to be sure of obeying the signals or of the street markings, and of watching cross-street traffic. On the other hand, if the entire left-hand edge of the glare-shield is spaced far enough from the left-hand riser of the windshield frame to permit a clear view of stop or street signs, the driver will be temporarily dazzled by oncoming headlights whenever he tilts his head sufficiently to the left to see such stop-lights or street signs.

My present invention aims to provide a glare-shield of such a shape, and with such a reduction of transparency in a certain part of the shield as to overcome all of the above recited objections to the previously proposed glare-shields. Furthermore, my invention aims to provide a glare-shield which will also serve as a sun shield, which will be of such a limited size as to leave a maximum of the area of the windshield uncovered by the glare-shield, and which—when constructed in a standard size—can readily be adapted for the use of drivers of widely varying heights and with windshields which vary in the elevations at which the upper ends of their panes are disposed, or in the slope of the windshield.

Illustrative of my invention,

Fig. 1 is an elevation of the upper left-hand portion of the frame and glass of a windshield having a glare-shield of my invention supported adjacent to the windshield by a suitable clamp.

Fig. 2 is an enlarged section taken along the line 2—2 of Fig. 1.

Fig. 3 is an elevation of the major part of the upper portion of a windshield pane, with dotted lines including those indicating certain road portions as seen by the driver and also a line along which an approaching headlight appears to travel.

Fig. 4 is a reduced interior elevation of the left-hand upper corner of the pane of a windshield, showing only the two fundamental glare-preventing parts of my glare-shield.

Fig. 5 is an enlarged elevation of the preferred embodiment of my invention, regardless of the means for supporting it.

Fig. 6 is a section taken along the line 6—6 of Fig. 5.

My here presented glare-shield is based in its general construction, shape and proportioning, and also in its approximate dimensions on the following observations and discoveries which I have made during a prolonged studying of the requirements for an effective glare-shield:

1. The driver of a typical American automobile usually is seated with his eyes approximately 24 inches from the windshield, and with his eyes normally looking through the windshield along a forwardly downward sloping view plane which intersects the windshield along a horizontal line approximately 1½ inches below that of his eyes, so that this view line can readily be determined for a driver of any height.

2. When thus looking forward, the right eye of the driver normally is close to the same vertical plane (longitudinal of the car) with the steering post.

3. When the driver's car is close to a marked center line of a road as is normally safe, namely with a clearance of only a couple of feet between his car and the center line, this center line appears on the windshield as a straight line which intersects the said plane of the steering post about three inches above the said intersection on the windshield by his view plane.

4. This center line on a level road slopes downward toward the left of the driver at an angle of approximately 30 degrees to the vertical.

5. The nearer headlight of a car approaching on the inner lane of the same road is seen through the windshield as approaching along a head-light line (H in Fig. 4) which intersects the said vertical plane of the steering post at the same level with the driver's eyes and which slopes downward toward the left at an angle of about 17 degrees to the horizontal.

6. The glare of such an approaching headlight is serious only along about 7 inches of the length of this head-light line, namely for 7 inches to the left from the intersection of the said head-light line with the vertical plane of the steering post, thus clearly defining the area which needs to be decidedly dimmed.

7. The vertical spread of the head-light glare on the windshield extends only for an average of about ⅞ of an inch both above and below the said head-light line.

8. A less intensive shielding of the head-light glare is also needed over an area surrounding the just mentioned area in which the glare is serious, both to allow for improper headlight adjustments and normal variations in the position of the driver's head, and also to avoid shocks to his eyes when he looks somewhat beyond the intensely shielded area.

9. This less intensely shielded area needs to reach at the right only to the road center line as seen on the windshield, but should reach to the left-hand riser of the windshield.

10. The upper left-hand corner of the windshield should be undimmed over an area extending toward the left from a vertical line about 8 inches to the left of the intersection on the windshield with the said vertical plane through the steering post, and extending downward from the top of the windshield approximately to the said view plane.

11. When the shield has a portion of the lighter dimming intensity extending upwardly to the top of the windshield, above the intense shielding area, this portion dims the glare of street both during straight-ahead driving and when turning corners, and also serves to a considerable extent as a sun-glare eliminator.

12. The semi-dense shield portion to the left of the less translucent area permits an adequate view of objects, pedestrians and closely approaching cars.

13. The strain on the eyes of the driver is also reduced when certain corner portions of the glare shield are rounded, instead of presenting sharp angles.

14. When a glare shield is constructed in harmony with the above recited observations, the shape of the shield aids in fixing the driver's view in the proper normal direction for a maximum of safety in driving and a minimum tiring of his eyes.

15. When an automobile is being driven in the inner lane of a highway, where the glare of approaching headlights will be greater than in the outer lane, the driver usually has his two eyes looking approximately through two horizontally spaced points $E^l$ and $E^r$ (in Fig. 3) which are both somewhat to the left of the vertical plane P of the steering wheel, namely two points on the horizontal view line V. Owing to the laws of perspective, the driver then sees a marked center-line C of the roadway as sloping upwardly toward the right at an angle of approximately 30 degrees to the vertical, and further to the left than the windshield portions through which his eyes respectively are looking, while the right-hand and left-hand curbs of an average wide street will appear along oppositely sloping lines B and $B^l$ respectively.

The two headlights of an approaching car in the inner oncoming lane of the roadway will also appear to travel along two relatively close lines which slope downwardly to the left, for which the line H (at an angle of approximately 17 degrees to the horizontal, represents the average. During this aproach of oncoming headlights, the glare will begin in obnoxiousness at a point F (Fig. 3), somewhat further to the left than either the center line C of a level roadway or the more inclined center line C¹ on a roadway which slopes upward forwardly away from the driver of the car.

The intensity of the glare increases as the oncoming car comes nearer, but owing to the concentration of the beam of the headlight by any reflector commonly used in it, this beam will cease to strike the eyes of the driver when the oncoming car has approached sufficiently so that headlight travel has reached a point N (Fig. 3) on the line H. Consequently, I have found that the eliminating of head-light glare, in its first essential, demands a dimming of a portion of the windshield extending along the said line H between the points F and N, and also extending sufficiently longitudinally and in both vertical directions from the said part of the line H to allow for variations in the heights at which headlights are mounted on different cars, and to allow for variations in position of the driver's head and in the slope of windshields.

For this purpose, my experiments have shown that the dimming of the approximate area enclosed by the outline D in Figs. 3 and 4, to the extent of reducing the transparency of that part of the windshield by about one-half, would alone be ample when this strip-like portion spreads for a distance of about one inch both above and below the line H at the point N and about ⅝ inch at the point F, when the driver is looking through this dimmed section of the headlight.

When operating a car, the driver usually looks to the right of the windshield part which I have just described as needing the dimming, so as to see what is squarely ahead of him, to keep clear of cars in the lane to his right, and to watch for both vehicles and pedestrians crossing the roadway from its right. However, the driver also must occasionally shift his view from the normally viewed part of the windshield to and from the just described head-light glare receiving portion, or to and from either the left-hand upper corner of the windshield to see a street or road sign at the left, or to and from a lower left-hand part of the windshield to see how closely he may be approached by the fender or wheels of an approaching car.

During each such (usually quick) shifting from an undimmed part of the windshield to a glare-shielded windshield part, or vice versa, the driver's eyes have to readjust themselves to the different intensity of the light; and when the driver's eyes shift directly from the decidedly dimmer portion to an entirely undimmed portion, the retinal shock is such that the driver is momentarily blinded, so that (for example) he could not quickly see that a car to his right was cutting into his lane or a pedestrian was starting to cross the roadway from the right-hand curb.

To obviate this difficulty, I also dim parts of the windshield bordering the above described portion D to a less extent than the dimming effect of the said portion, and for that purpose I have found that the less dimming border portion both above and below the said strip-like portion D need only be about one-sixth as wide as the width of the said densely dimmed portion. I have also found it important to extend this less dimmed glare-shield portion all the way to the left-hand riser of the wind-shield frame, and to make this border portion of a density not greater than three-fourths that of the strip portion D, so that the left-hand part of my less-dimming glare-shield will be sufficiently translucent to allow the driver to see the forward portions of an approaching car, or other traffic conditions.

Moreover, I have found it important to have this less dense border portion of my glareshield extend substantially up to, but not beyond, the line C along which the street center marking is seen on the windshield by the driver.

When thus proportioned, the lower right-hand corner of my glare-shield will be approximately at the same level as the points E¹ and Eʳ (Fig. 3) through which the two eyes of the driver normally view the road, and only slightly to the left of the point E¹ through which his left eye sees the road during the major portion of the driving. In addition, I have found that if this lower right-hand corner is sharp, the sharpness of the angle will cause an undue shock to the driver's eyes when he quickly shifts his view laterally to and from its normal direction. This I have overcome by rounding the said corner, desirably at a radius of approximately five-eighths of an inch.

Such a glare shield can be cheaply constructed (as shown in Figs. 3 and 5) of two pieces of translucent material cemented to each other and the assembled glare-shield supported in any convenient manner, and I have found green translucent sheet materials well suited for this purpose. Thus constructed, I have found a glare shield shaped and positioned as shown in Fig. 4 admirably meets the minimum requirements for adequately protecting the driver's eyes against headlight glare.

However, I preferably augment this minimum shaping of my glare-shield, which is shown in full lines in Fig. 5, by also extending part but not all of the less dimming major member of my glare-shield upwardly; namely the part of the said major member reaching to its right-hand end and extending toward the left above only about four-fifths of the length of the strip-like secondary (or more dense) member, as indicated by the dotted lines 1 and 2.

In so doing, I provide my glare-shield with a recess in the left-hand corner of the glare shield, bordered at its right by the generally upright line 1 and at its bottom by the upper edge 2 of the heretofore described fundamental minimum of my shield. This recess preferably has the juncture of the said edges 1 and 2 rounded (as shown at 1a) to avoid the retinal shock to the observer which would occur if his vision traversed a sharp-angled juncture between a dimmed and an undimmed part of the windshield.

As shown in Fig. 5, the just described upward extension of the less dense main part of my glare shield also has a tab 4 extending upwardly from it, which tab can extend between the two webs of a clamp 5 (Figs. 1 and 2) fast upon a horizontal shaft 6 which extends through two bearings 7 fastened to the upper frame member U of the windshield, the shaft having friction heads 8 at its ends so as to latch the glare shield either in its illustrated depending position or raised out of the driver's view during the day.

With my preferred type of glare shield shaped and proportioned as indicated by the angle-marked lines in Fig. 5, the only moderately dense portion of the glare shield above the line 2 of that figure allows the driver to see stop or street signs and traffic conditions clearly through it when turning corners. In addition, this upper part of the glare shield will also reduce sun glare under many conditions.

Since the recess in the glare shield extends across the apparent left-hand curb line B¹ in Fig. 4, the driver can readily see all except the lower leg portions of pedestrians at or near this curb, in addition to having a clear view of left-hand stop and street signs through the said recess. And with the lower edge of the glare shield at the illustrated height and sloping upwardly to the right at an angle of about 21 degrees, the driver also can see all objects on sidewalks as well as the forward portions of any car in the next lane to his left, so as to guard adequately against accidents.

Moreover, with the sloping right-hand edge of my glare-shield disposed as here shown, the driver does not look through this shield during the major portion of his driving, so that the safety of his driving is assured even on dimly lighted streets or highways. And, since the part of the glare shield to the left of the left-hand edge D¹ of the denser shield portion reduces the glare of a relatively near approaching headlight (which then directs only "fringe rays" toward the driver), the driver's view of the nearer parts of the approaching car is not reduced. Consequently, the lighting of the road by the approaching headlight aids him in clearly seeing the condition of the road instead of blurring his view of the road.

In practice, the height to which my glare shield extends upwardly beyond the line 2 of Fig. 4 would, of course, have to be varied according to the elevation of the upper edge T of the windshield pane above the normal view line V (Fig. 3), so as to adapt my shield to different cars and to decided differences in the heights of the drivers, although I have found the effectiveness of my here disclosed shield substantially equal regardless of the now customary variations in the slope of the windshield pane.

When constructed and disposed as above described, my glare shield extends only across a relatively small left-hand portion of the windshield through which the driver of a car views the road during the greater part of his driving; and, since the driver can see more sharply through an undimmed part of a windshield, my glare shield automatically causes him to look normally through the undimmed windshield portion adjacent to the lower right-hand corner of my glare shield, instead of shifting his view laterally from time to time.

Consequently, my glare shield automatically causes the driver of the car to fix his view in the direction which affords a maximum of safety for his driving and a minimum tiring of his eyes, namely with his two eyes viewing the road respectively through the two points E¹ on the windshield pane in Fig. 4. However, owing to the rounded shield corner adjacent to the part of the windshield pane through which the driver has this proper normal view, his eyes receive no retinal shocks when he shifts his view to the part of the windshield across which my glare shield extends, or back from the latter. So also, the gradation in dimming afforded by my having a less-dimming shield portion extending around the more intensely dimming portion D, I reduce the strain on the driver's eyes when he shifts his view to and from the line of travel of approaching headlights.

However, while I have heretofore illustrated and described my glare shield as designed for adequately shielding the driver's eyes while still leaving the major portion of the upper half of the windshield pane undimmed, and as shaped and proportioned so as not to conceal any causes of probable accidents, I do not wish to be limited to the details of what I have thus disclosed, since many changes might be made without departing either from the spirit of my invention or from the appended claims.

For example, the recess in the upper left-hand corner of my glare shield might be omitted if the driver's car is to be used mainly on highways familiar to the driver, so that the additional protection against sun-glare is more important to him than the ability to see street signs or stop signs sharply through this corner of the windshield. Likewise, the extent to which each of the two parts of my glare shield dims the view may be varied, as also the color of these shield parts.

The part D of my glare shield may even be used alone with considerable effectiveness; or the larger part of my shield might project farther downwardly beyond the said part D, although with a corresponding sacrifice of the enhanced safety which is afforded by the extent to which the driver can see both parts of approaching cars and legs of pedestrians below my glare shield when of the here disclosed size. For those with small purses, even the part D of my glare shield alone, if of an adequate density, will effectively reduce head-light glare, although not affording some of the other above described advantages of my two-part glare shield.

It should also be obvious without separate illustration that, instead of building up my glare shield from two separate sheets, this might be manufactured of a single sheet in which the transparency increases gradually away from a sheet portion corresponding to my said part D. So also, it is to be understood that if cars are constructed so that the spacing of the driver from the windshield pane differs decidedly from the now common one, or so that the position of the plane of the steering wheel axis with respect to the left-hand edge of the windshield pane is considerably altered from the present custom, the size and shape of my glare shield would need to be correspondingly varied in harmony with the here recited principles on which it is based.

In practice, the height to which my glare shield extends upwardly beyond the line 2 of Fig. 3 would of course have to be varied, according to the elevation of the upper edge T of the windshield pane above the normal view line V, so as to adapt my shield to different cars and to decided differences in the heights of the drivers, although I have found the effectiveness of my here disclosed shields substantially equal regardless of the now customary variations in the slope of the windshield pane.

Moreover, when my glare shield is constructed of two superposed parts, it is immaterial whether the smaller strip-like part D is affixed to the forward face of the larger trapezoidal part or to the rearward face of the latter.

I claim as my invention:

1. A glare eliminator positioned at the windshield of an automobile for protecting a driver having his eyes approximately two feet from the windshield; comprising a flat translucent sheet reaching to the top of the windshield and having its right-hand edge sloping downward, at an angle of approximately 30 degrees to the vertical, from a point on the windshield approximately 3 inches above the view plane at which the driver of the automobile normally views the road about 100 feet ahead of him; the lower edge of the said sheet sloping downward, at an angle of about 21 degrees to the horizontal, along a line extending from a point on the windshield and the said view plane approximately 1¾ inches to the left of a vertical plane along the axis of the steering wheel of the automobile, and the said lower edge reaching to the left-hand edge of the windshield from the upper end of the said sheet extending to the left along the upper edge of the windshield from the upper end of the said right-hand edge of the shield for a distance not exceeding approximately two-thirds of the horizontal distance between the said vertical plane and the left-hand edge of the windshield; the sheet having a recess in its upper left-hand corner, the said recess having an upright right-hand edge and having its lower edge disposed along a line which slopes downwardly toward the left, from a point on the windshield in the said vertical plane approximately 2 inches above the intersection of the windshield by the said view plane.

2. A glare eliminator as per claim 1, in which the said sheet includes a portion of reduced transparency spaced, approximately evenly from the lines along which the lower edge of the sheet and the lower edge of the recess extend and by a distance of approximately $\tfrac{5}{16}$ inch from each of the last named two edges, the said portion having an extreme length of approximately 7 inches and having its right-hand end approximately 2½ inches to the left of the said vertical plane.

3. A glare eliminator as per claim 1, in which the said sheet includes a portion of reduced transparency spaced, approximately evenly from the lines along which the lower edge of the sheet and the lower edge of the recess extend and by a distance of approximately $\tfrac{5}{16}$ inch from each of the last named two edges, the said portion having an extreme length of approximately 7 inches and having its right-hand end approximately 2½ inches to the left of the said vertical plane and having substantially rounded ends.

4. A glare eliminator as per claim 1, in which the lower right-hand corner of the said recess is rounded at a radius of approximately between three-fourths of an inch and one inch.

5. A glare eliminator positioned at the windshield of an automobile for protecting the eyes of the driver of the automobile, comprising a generally trapezoidal flat translucent sheet presenting its upper right-hand corner at the upper edge of the windshield and presenting its right-hand edge along the line in which the driver views the center-line of a level road, the shield having its lower edge sloping downwardly toward the left at an angle of approximately 21 degrees to the horizontal, the left-hand upper corner of the shield having a recess not more than approximately three inches wide at its upper end, and having a portion of reduced translucency of an extreme length of not exceeding about seven inches, the said sheet portion having as its longitudinal axis the leftward downwardly sloping line along which the driver sees the headlights of automobiles in the adjacent lane approaching; the said sheet portion extending for about 1¼ inches to the left beyond the line of the right-hand edge of the said recess, and having a maximum width of approximately two inches, and having its upper and lower edges approximately a quarter of an inch respectively from lower edges of the shield and the said recess.

6. As a glare eliminator for use at the windshields of an automobile, a substantially trapezoidal and flat translucent sheet-like member extending across the part of the windshield through which the driver normally views the road ahead of him, the said member presenting its left-hand edge at the left-hand riser of the windshield and its upper right-hand corner adjacent to the intersection of the upper end of the windshield with a vertical plane along the axis of the steering wheel of the automobile, the right-hand edge of the said member sloping downward toward the left from the said corner at an angle of approximately 30 degrees to the said plane, and the said right-hand edge extending downwardly to the level at which the eyes of the driver of the vehicle normally look through the windshield when viewing the portion of the road approximately 100 feet ahead of the automobile; the lower edge of the said member sloping downwardly to the left from the lower end of the said right-hand edge at an angle of approximately 21 degrees to the horizontal; and the upper edge of the said member sloping downwardly to the left from the said intersection at an angle of approximately 13 degrees to the horizontal; the portion of the said member which is spaced vertically by approximately five-sixteenths of an inch from the upper and lower edges of the said member, and which is spaced horizontally from the said riser and from the said intersection by approximately two inches, being approximately one-third as transparent as an ordinary glass pane, and the remaining portion of the member being approximately one-sixth as transparent as an ordinary glass pane.

7. A glare eliminator as per claim 6, in which the lower right-hand corner of the said sheet-like member is cut away substantially along an arc tangential to both the right-hand edge and the lower edge of the member, the radius of the said arc being approximately one inch.

CHESTER A. KLISE.